(12) United States Patent
Shin et al.

(10) Patent No.: US 12,719,068 B2
(45) Date of Patent: Aug. 25, 2026

(54) HYDROGEN ACTIVATION/IONIZATION ACCELERATING APPARATUS HAVING FINGERPRINT-TYPE PANEL STACK STRUCTURE

(71) Applicants: Sang Yong Shin, Seoul (KR); Young Woo Vach, Gangwon-do (KR); Jaeun Shin, Seoul (KR)

(72) Inventors: Sang Yong Shin, Seoul (KR); Young Woo Vach, Gangwon-do (KR); Jaeun Shin, Seoul (KR)

( * ) Notice: Subject to any disclaimer, the term of this patent is extended or adjusted under 35 U.S.C. 154(b) by 163 days.

(21) Appl. No.: 18/843,549

(22) PCT Filed: Mar. 3, 2023

(86) PCT No.: PCT/KR2023/002905
§ 371 (c)(1),
(2) Date: Sep. 3, 2024

(87) PCT Pub. No.: WO2023/167524
PCT Pub. Date: Sep. 7, 2023

(65) Prior Publication Data

US 2025/0191870 A1 Jun. 12, 2025

(30) Foreign Application Priority Data

Mar. 3, 2022 (KR) ........................ 10-2022-0027566
Nov. 1, 2022 (KR) ........................ 10-2022-0144054

(51) Int. Cl.
*H01M 8/04858* (2016.01)
*H01J 1/304* (2006.01)
(Continued)

(52) U.S. Cl.
CPC ....... *H01M 8/04947* (2013.01); *H01J 1/3048* (2013.01); *H01M 8/04089* (2013.01);
(Continued)

(58) Field of Classification Search
CPC ......... H01M 8/04947; H01M 8/04089; H01M 8/04201; H01M 8/22; H01M 8/04932; H01J 1/3048
See application file for complete search history.

(56) References Cited

U.S. PATENT DOCUMENTS 3,133,837 A * 5/1964 Eidensohn .............. H01M 8/06 429/421
2004/0028965 A1 * 2/2004 McElroy ........... H01M 8/04462 429/413

(Continued)

FOREIGN PATENT DOCUMENTS

KR 102200739 1/2021

*Primary Examiner* — Mary Ellen Bowman
(74) *Attorney, Agent, or Firm* — IPLA P.A.

(57) ABSTRACT

A hydrogen activation/ionization accelerating apparatus with a fingerprint-type panel stack structure is installed between a hydrogen fuel cell and a hydrogen supply device to serve as a turbocharger/accelerator, whereby the hydrogen supplied to the hydrogen fuel cell is activated by high-density string electric field force to be supplied in a high-energy state to a hydrogen fuel cell stack, and therefore, an ionization layer catalyst of the hydrogen fuel cell improves the activation/ionization rate by low energy to increase the bonding rate of hydrogen and oxygen, leading to the generation of a large amount of electricity.

4 Claims, 13 Drawing Sheets

(51) Int. Cl.
*H01M 8/04082* (2016.01)
*H01M 8/04089* (2016.01)
*H01M 8/22* (2006.01)

(52) U.S. Cl.
CPC ... *H01M 8/04201* (2013.01); *H01M 8/04932* (2013.01); *H01M 8/22* (2013.01)

(56) References Cited

U.S. PATENT DOCUMENTS

2005/0146836 A1* 7/2005 Minnear .......... H01M 8/04216 361/303
2025/0006958 A1* 1/2025 Williams .......... H01M 8/04126

* cited by examiner

FIG. 1

Hydrogen Tank
A
HIB
1
Sub Battery
11
$V_{battery}$
Fuel Cell
B
DC-DC Converter
Battery
Power flow
Inverter
Motor

Side View
Inlet
$H_2$
111
1111
10
20
Outlet
121
$H^+$

HYDROGEN ACTIVATION/IONIZATION ACCELERATING APPARATUS HAVING FINGERPRINT-TYPE PANEL STACK STRUCTURE

TECHNICAL FIELD

The present invention is installed between a hydrogen fuel cell stack and a hydrogen gas supply device, and before hydrogen is supplied to the hydrogen fuel cell stack, hydrogen is activated or ionized to a high energy level in a high-density electric flux and then injected, so that ionization progresses with only a small amount of energy absorption in the ionosphere of a conventional hydrogen fuel cell, thereby increasing the efficiency of ionization. This physical auxiliary activation/ionization progress is an invention related to an amplifying (turbo)/accelerating device that can generate a lot of electricity with higher efficiency in the electricity generation process of a hydrogen fuel cell stack.

BACKGROUND ART

In the past 10 years, the energy consumption in Korea has been increasing by more than 10% annually. Greenhouse gas emissions increase in proportion to the increase in energy consumption. Currently, research and development on new renewable energy that can reduce greenhouse gas emissions is actively being conducted worldwide, and this development can play a leading role in various applications and applications.

Among the new renewable energies being actively developed, the turbo-role device of hydrogen fuel cells is expected to be applied to solar thermal energy and various forms of alternative energy. In particular, hydrogen energy has the potential to obtain hydrogen by electrolyzing water, which exists infinitely, and can produce energy by reacting it with air, and can produce hydrogen in various ways such as methane and natural gas separation, and it does not produce pollutants, and furthermore, it does not produce noise when producing energy, has high energy production efficiency, and is widely applied to various types of electricity generation equipment, so it is receiving more attention than other new renewable energies. In addition, hydrogen and oxygen, the basic materials of hydrogen fuel cells, are the most abundant elements on Earth. Therefore, hydrogen is being studied more than other new renewable energies.

However, most hydrogen fuel cells and devices connected to them developed to date have limitations in converting hydrogen energy into electrical energy with higher efficiency than the function of existing hydrogen fuel cells, have the problem of high operating temperature, and currently have limitations in amplifying the mass of hydrogen ionized/activated by catalytic action in the existing hydrogen fuel cell ionosphere, which makes it difficult to maximize efficiency.

(Patent Document 1) Republic of Korea Registered Patent No. 10-2200739 (Publication Date: Jan. 12, 2021)

SUMMARY OF THE INVENTION

The problem to be solved by the present invention is that, before hydrogen used in a hydrogen fuel cell stack is completely ionized ($2H^{+}+2e$) in the electrolyte of the cell, only a portion is activated ($H_2$*) from various catalysts and the majority is not activated, resulting in low overall electricity generation and, therefore, low economic efficiency of the hydrogen fuel cell. That is, the purpose of the present invention is to induce a highly efficient electricity production method by maximally activating hydrogen gas and simultaneously increasing the ionization rate.

The problems to be solved by the present invention are not limited to the problems mentioned above, and other technical problems not mentioned will be clearly understood by those skilled in the art from the description below.

Technical Solution

In order to achieve the above technical task, the hydrogen activation/ionization accelerating apparatus having a stack structure of various types of fingerprint type panels (hereinafter referred to as "fingerprint panels") of the present invention is a structure installed between a hydrogen supply device (A) and a hydrogen fuel cell stack (B), and an ultra-high density electric flux formed therein simultaneously ionizes (2H++2e) and activates (H2*) hydrogen gas and then supplies it to the hydrogen fuel cell stack, so that hydrogen can be ionized more easily and efficiently in a basic hydrogen fuel cell stack and the electricity generation rate can be increased.

The hydrogen activation/ionization accelerating apparatus with a fingerprint-type panel stack structure comprises, a case in which an accommodation space is formed inside, a gas inlet tube is formed at one end to be connected to the accommodation space and a hydrogen supply device, and a gas discharge tube is formed at the other end to be connected to the accommodation space and a hydrogen fuel cell; and a fingerprint panel unit comprising, a first fingerprint panel and a second fingerprint panel which are formed as multiple fingerprint-shaped panels in a concentric circle from the center to the outside, with circular threads, circular grooves (the ends of the threads and grooves are sharp bumps with concentric circles in the shape of fingerprints), and multiple connecting holes formed at one end and the other end, and an intervening unit comprises a plurality of overlapping holes, and is interposed between the first fingerprint panel and the second fingerprint panel so that the overlapping holes overlap with the connecting holes, wherein the first fingerprint panel is connected to the positive electrode of the power supply and the second fingerprint panel is connected to the negative electrode of the power supply to activate and ionize hydrogen flowing between the first fingerprint panel and the second fingerprint panel.

Here, the fingerprint panel has a concentric circular bump shape with sharp ends, which suppresses up/down/left/right twisting and bending, and also prevents electrical shorting of the negative/positive poles. The sharp blade shape has two advantages: it forms an electric field where the high-density linear electric flux is very high, so it can easily extract electrons (field emission electrons) from hydrogen atoms.

The first fingerprint panel and the second fingerprint panel comprises a plurality of receiving grooves formed on one side and the other side. And the apparatus further comprises a fixing bar unit that penetrates one connecting hole formed in the first fingerprint panel, one overlapping hole formed in the intervening module, and one connecting hole formed in the second fingerprint panel, and fixes the first fingerprint panel, the intervening module, and the second fingerprint panel. In addition, since electrons generated from hydrogen ionized by the high-density electric field flux formed between the first and second fingerprint panels, which are connected at one end to the first fingerprint panel and the other end to the second fingerprint panel, are electrons generated before being injected into the Fuel Cell Stack, they are joined to the electricity generated from the existing hydrogen fuel cell or charged into the auxiliary battery unit and used when necessary. This process is repeated N times, greatly improving the overall electricity generation rate.

Advantageous Effects

The present invention increases the activation energy of hydrogen by repeatedly activating/ionizing hydrogen multiple times, and then supplies ionized hydrogen ($2H^{+}+2e$) and hydrogen with high activation energy ($H_2$*) to a hydrogen fuel cell, thereby enabling a large amount of electricity to be generated from the hydrogen fuel cell. The present invention activates hydrogen to an ionization energy level state by using an ultra-high density electric flux and increases it to −1.5 to 0.0 eV, and then applies energy required to ionize ground state electrons in hydrogen atoms in the ionosphere of a hydrogen fuel cell stack to the activated hydrogen, so that electrons are easily released from the hydrogen, thereby greatly increasing the ionization rate of the hydrogen. The present invention improves the electricity generation efficiency of a hydrogen fuel cell stack into which ionized hydrogen is introduced, and enables activation and ionization of hydrogen by only a physical method without using a chemical method.

Furthermore, the present invention allows the electricity generated in the process of activating and ionizing hydrogen multiple times to be combined with the electricity generated in a conventional hydrogen fuel cell structure or stored in a battery and then output and used as electricity when necessary. That is, the present invention can increase the electricity generation rate by amplifying the ionization ($2H^{+}+2e$) of hydrogen and activated hydrogen ($H_2$*) multiple times.

According to the present invention, since all substances and materials in the internal configuration physically interact with pure (99.99999%) hydrogen gas, there is no corrosion/wear, etc., so it can be used semi-permanently.

In addition, the present invention is not limited to fuel cells for passenger cars, but can be applied to construction machinery and ships, such as forklifts, excavators, and internal generators for yachts, drones, salvage ships, and passenger ships, so that the performance of the fuel cell can be improved. In other words, the present invention is viewed as an amplification (turbo)/acceleration device that can be applied to various equipment using hydrogen cells to improve the performance and efficiency of the hydrogen cell.

DESCRIPTION OF DRAWINGS

FIG. 1 is a block diagram showing a state in which a hydrogen activation/ionization accelerating apparatus having a fingerprint panel stack structure according to one embodiment of the present invention is used as an amplification (turbo)/acceleration device added to an existing hydrogen fuel cell system.

FIGS. 5 to 7 are side exploded drawings specifically showing the fingerprint panel unit shown in FIG. 4.

DETAILED DESCRIPTION OF THE INVENTION

Best Mode

The invention will become clearer through the description with the accompanying drawings, and the advantages and features of the embodiments of the invention. However, the invention, which becomes clearer through the drawings and description, is not limited to the embodiments disclosed below. The invention is defined solely by the claims and is limited according to the contents set forth in the claims.

Hereinafter, the present invention will be described in detail with reference to the attached drawings so that a person skilled in the art to which the present invention pertains can fully understand the present invention.

First, a hydrogen ionization accelerating apparatus having a fingerprint panel stack structure according to one embodiment of the present invention will be generally described with reference to FIG. 1.

Figure 1:
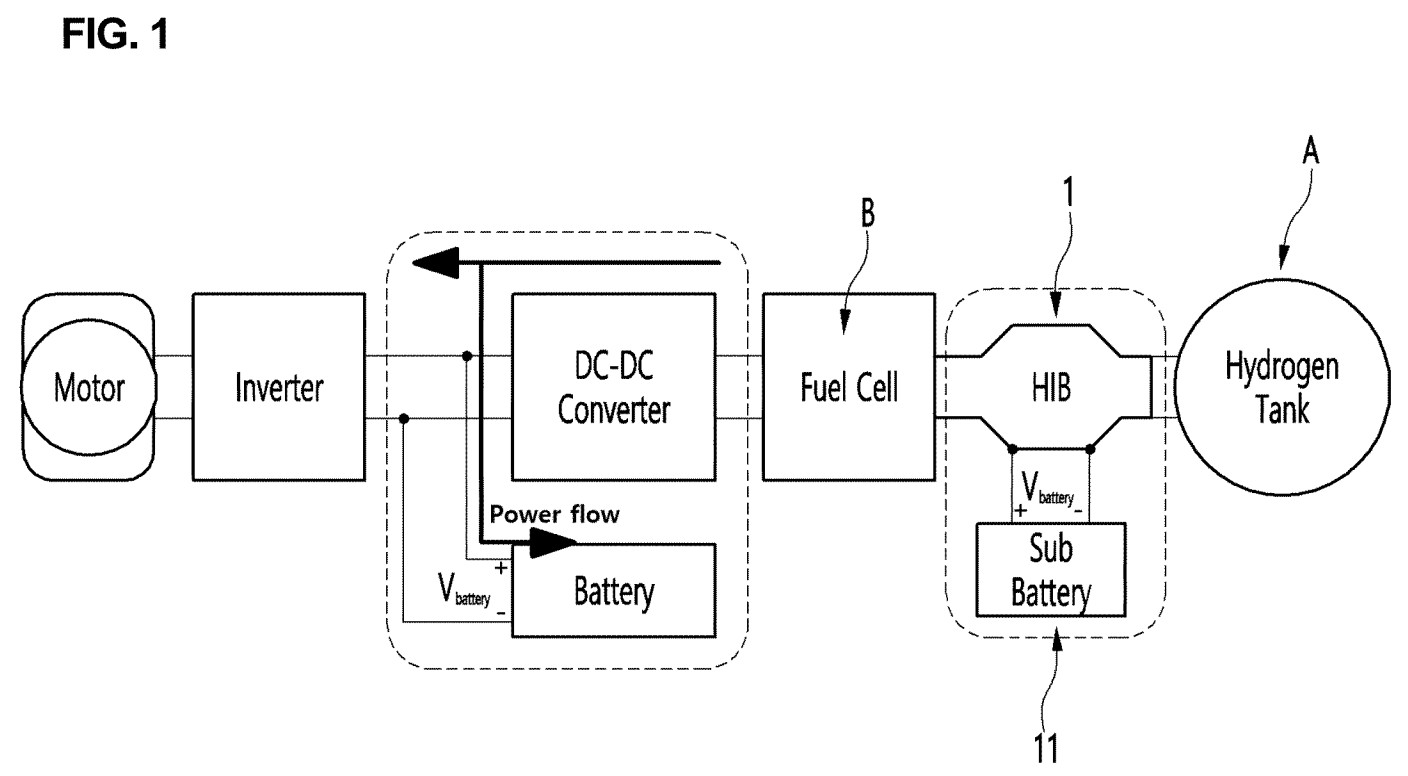

FIG. 1 is a block diagram showing a state in which a hydrogen activation/ionization accelerating apparatus having a fingerprint panel stack structure according to one embodiment of the present invention is used as an amplification (turbo)/acceleration device added to an existing hydrogen fuel cell system.

The hydrogen activation/ionization accelerating apparatus (1) having a fingerprint panel stack structure repeatedly activates and ionizes hydrogen supplied from a previously installed hydrogen supply device (B) when it passes through an activation/ionization accelerating apparatus (HIB), thereby increasing the overall activation energy of hydrogen and supplying it to a hydrogen fuel cell stack (B), thereby enabling a large amount of electricity to be produced from the hydrogen fuel cell stack (B). The electricity generated by ionization here can be combined with the electricity generated from the existing hydrogen fuel cell or can be separately charged to an auxiliary battery unit (11) and reused when necessary.

In this way, the present invention can increase the electricity generation rate of the hydrogen fuel cell stack (B) by repeatedly amplifying ionized hydrogen ($2H^{+}+2e$) and activated hydrogen ($H_2$*) several times and supplying them to the hydrogen fuel cell stack (B). The hydrogen activation/ionization accelerating apparatus (1) having such a sharp-edged fingerprint-shaped uneven panel stack structure is not limited to fuel cells for passenger cars, but can be applied to construction machinery and ships, such as forklifts, drones, excavators, and internal generators for yachts, salvage ships, and passenger ships, so that the performance of the fuel cell can be improved.

Accordingly, the present invention can solve the problem of the current hydrogen fuel cell stack (B), that is, the problem of not being able to generate sufficient electricity with the supplied hydrogen.

Hereinafter, components constituting a hydrogen activation/ionization accelerating apparatus having a fingerprint panel stack structure will be specifically described with reference to FIGS. 2 and 3.

Figure 2:
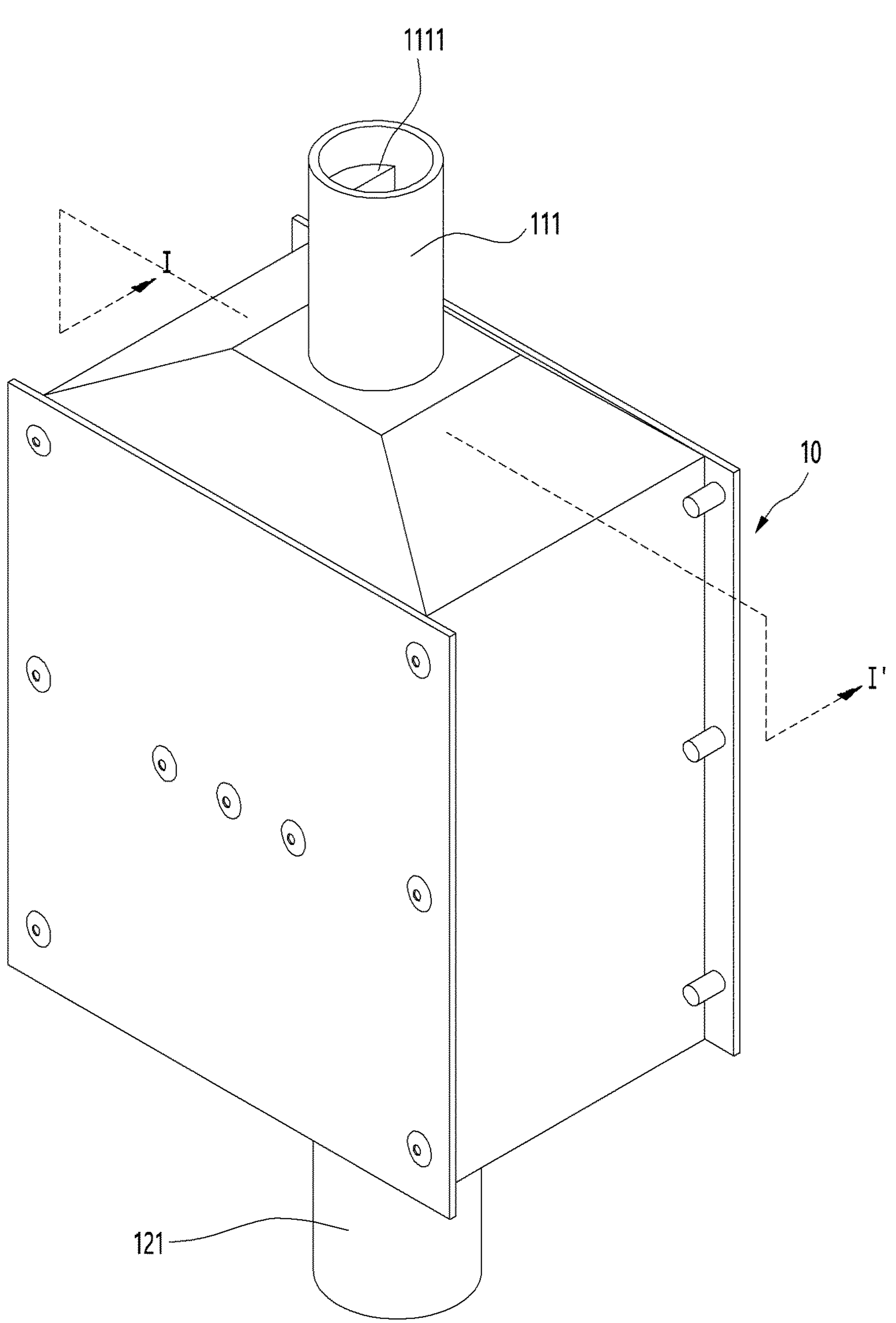
FIG. 2 is a perspective view of the entire overall external appearance of a hydrogen activation/ionization accelerator having the fingerprint panel stack structure of FIG. 1.
Figure 3:
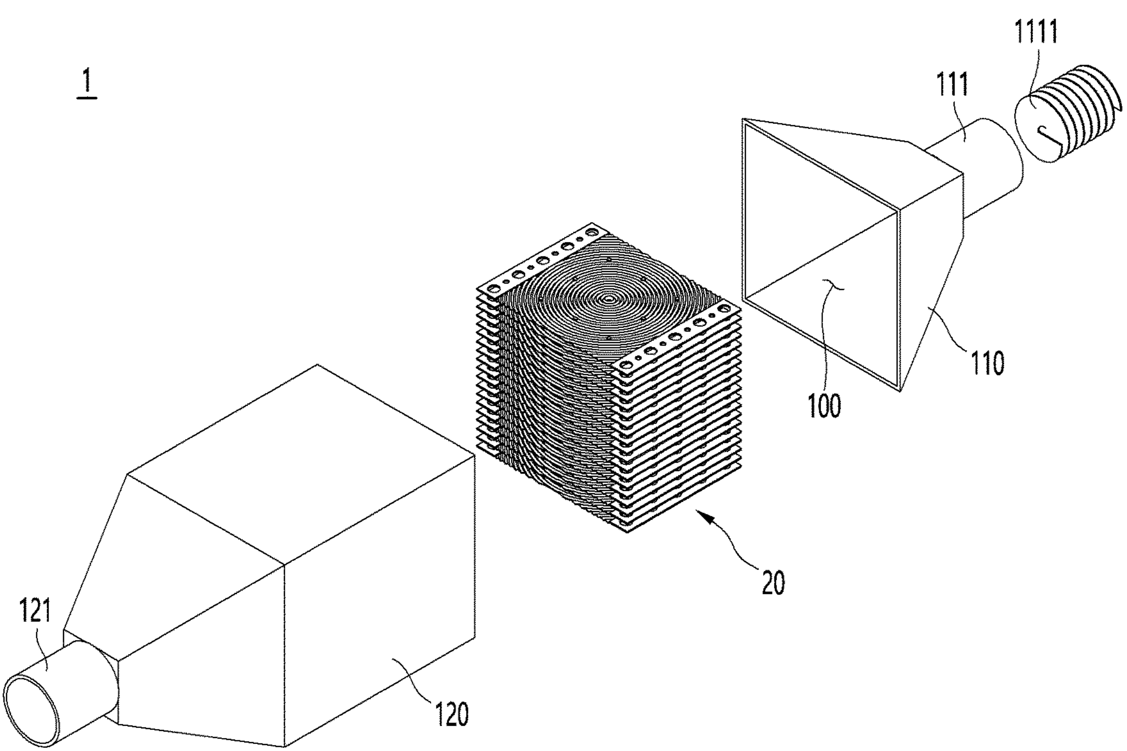
FIG. 3 is a perspective view of an activation/hydrogen ionization accelerating apparatus having the fingerprint panel stack structure of FIG. 2, broken down into large units.

FIG. 2 is a perspective view of the entire overall external appearance of a hydrogen activation/ionization accelerator having the fingerprint panel stack structure of FIG. 1, and FIG. 3 is a perspective view of an activation/hydrogen ionization accelerating apparatus having the fingerprint panel stack structure of FIG. 2, broken down into large units.

The hydrogen activation/ionization accelerating apparatus (1) having a fingerprint panel stack structure comprises a case (10) and a fingerprint panel unit (20). Here, the fingerprint panel unit (20) becomes a panel that activates and ionizes hydrogen. In addition, the hydrogen activation/ionization accelerating apparatus (1) having a fingerprint panel stack structure may comprise an auxiliary battery unit (11). The case (10) enables activation and ionization to occur in a passage through which hydrogen supplied through a hydrogen supply device (A) moves through the hydrogen activation/ionization accelerator (1) before being injected into a hydrogen fuel cell stack (B).

The case (10) is composed of a cover unit (110) having an accommodation space (100) formed therein and a body unit (120) having an accommodation space (100) formed therein and connected to the cover module (110). Here, the cover unit (110) and the body unit (120) can be formed as shown in FIGS. 2 and 3. At this time, a cylindrical gas inlet tube (111) is formed at one end of the cover unit (110) and a cylindrical gas discharge tube (121) for discharging activated/ionized hydrogen is formed at the other end of the body unit (120). Here, an inlet screw module (1111) can be installed in the gas inlet tube (111) of the cover module (110) so that hydrogen supplied from the hydrogen supply device (A) can be smoothly injected into the accommodation space inside the case (10). The inlet screw module (1111) can be a module formed in various spiral shapes.

Hereinafter, the fingerprint panel unit will be described in more detail with reference to FIGS. 4 to 8.

Figure 4:
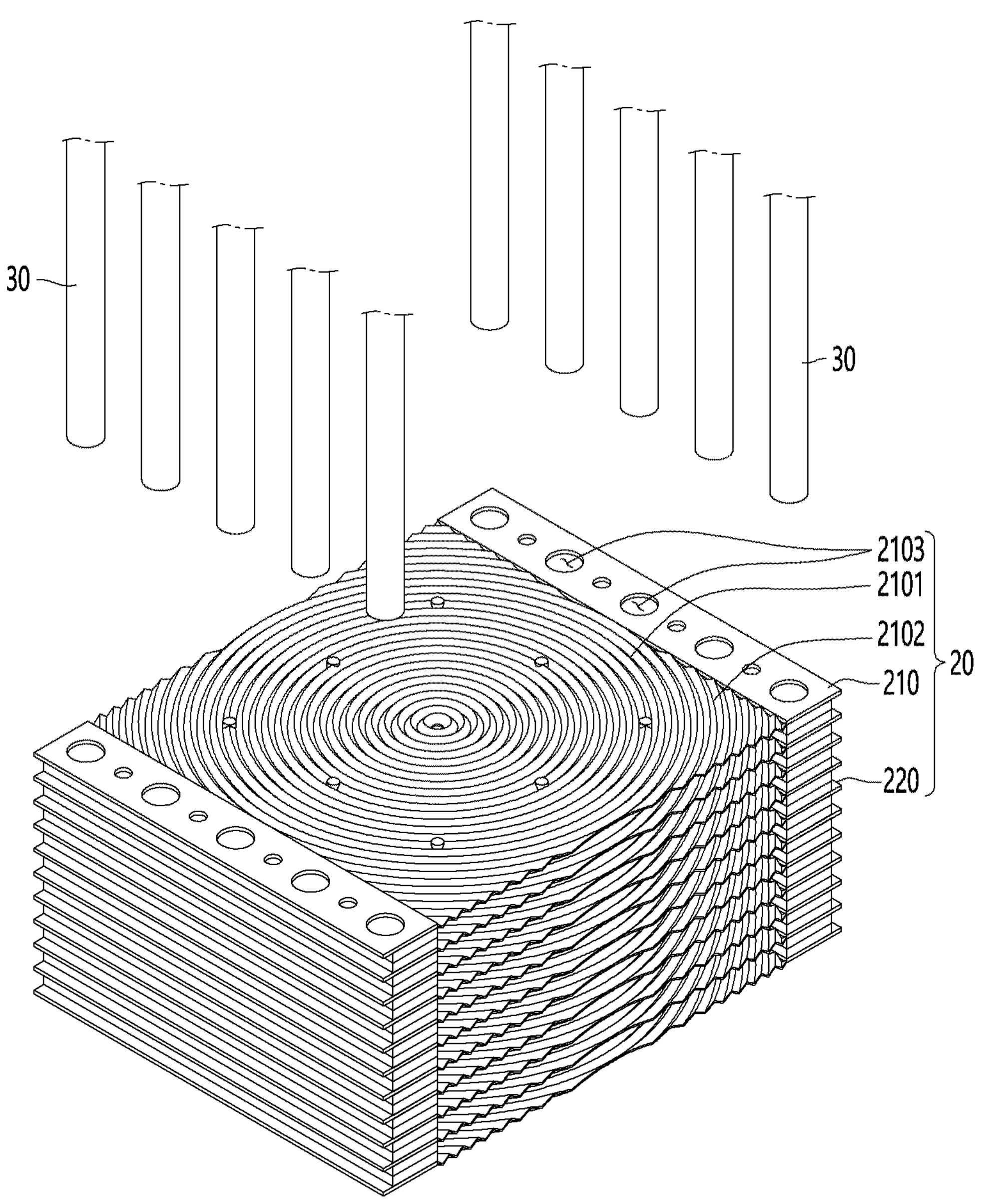
FIG. 4 is a drawing showing a fingerprint panel unit in which multiple fingerprint panels are stacked while maintaining a certain interval.
Figure 5:
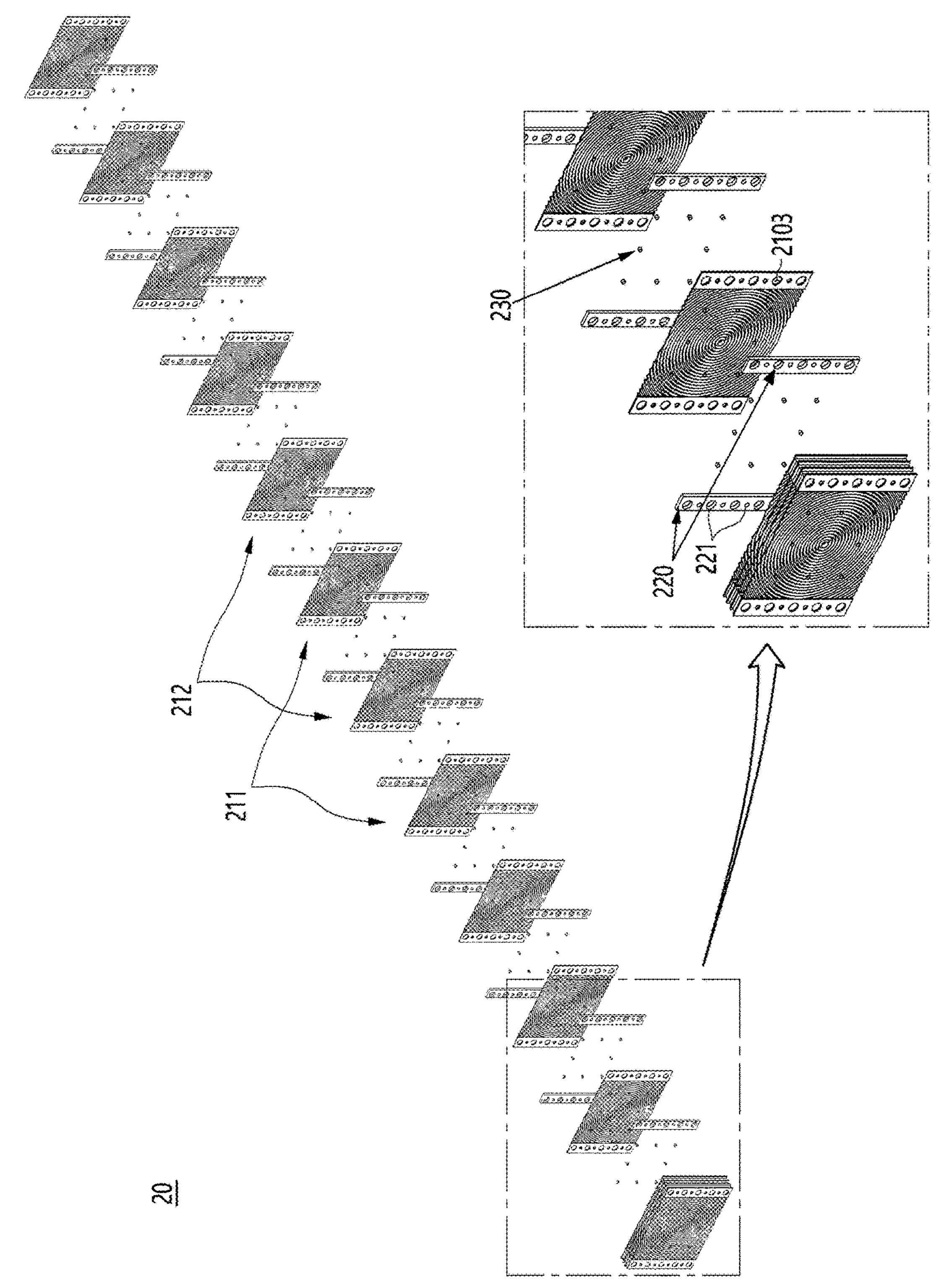
Figure 6:
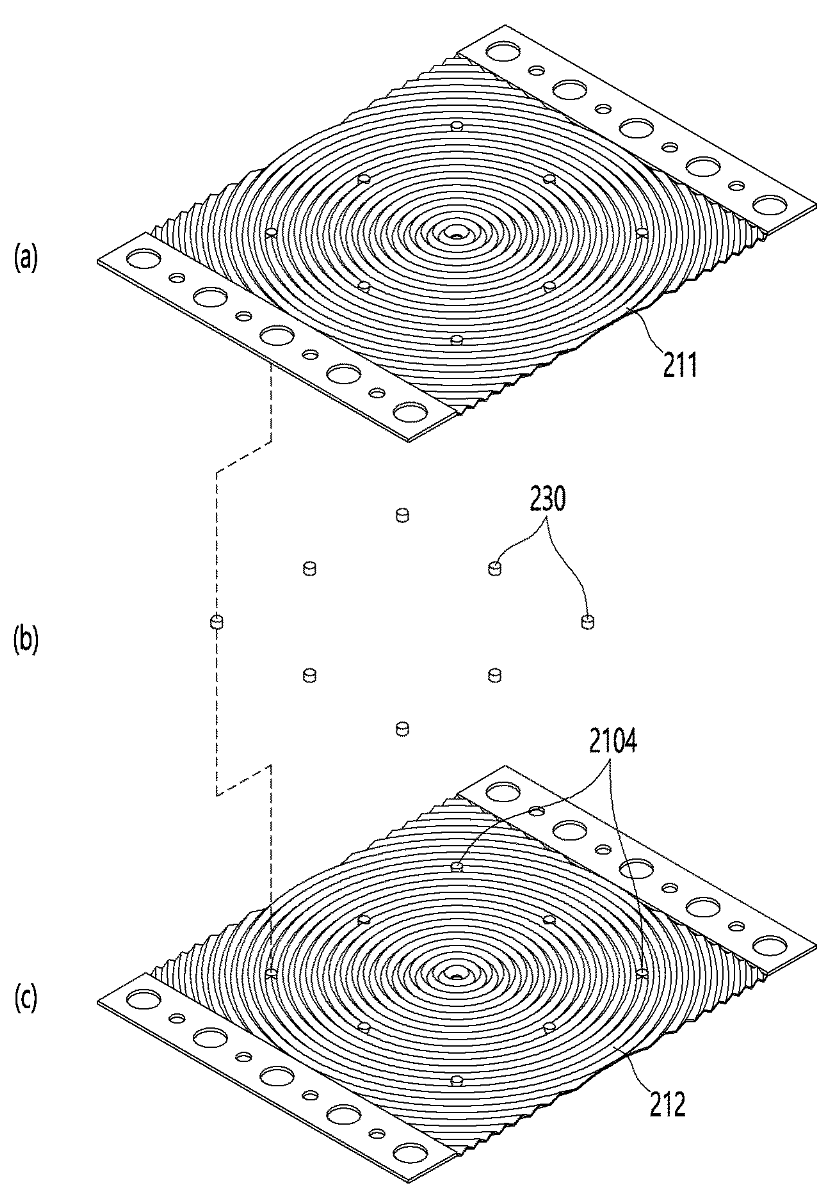
Figure 7:
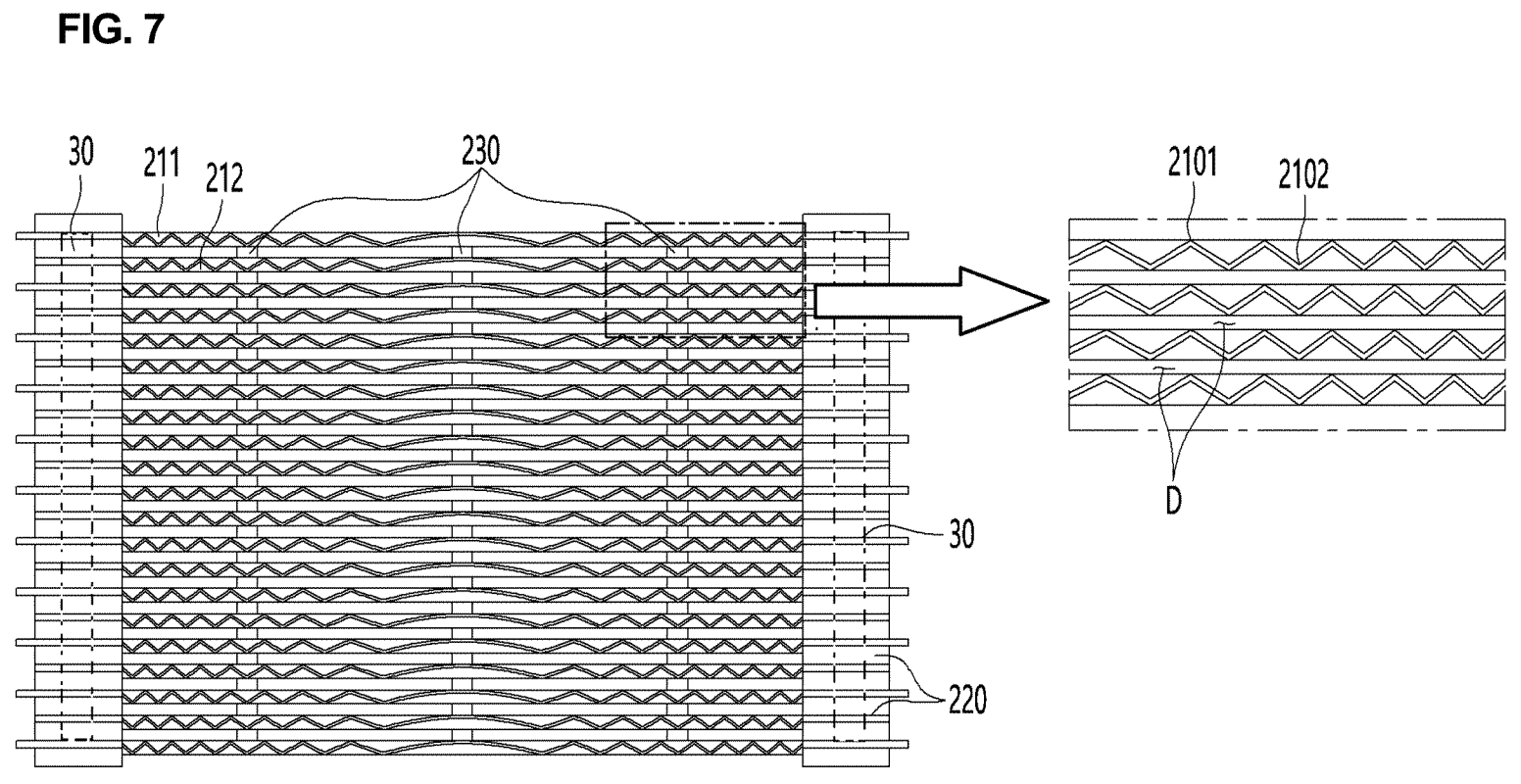
Figure 8:
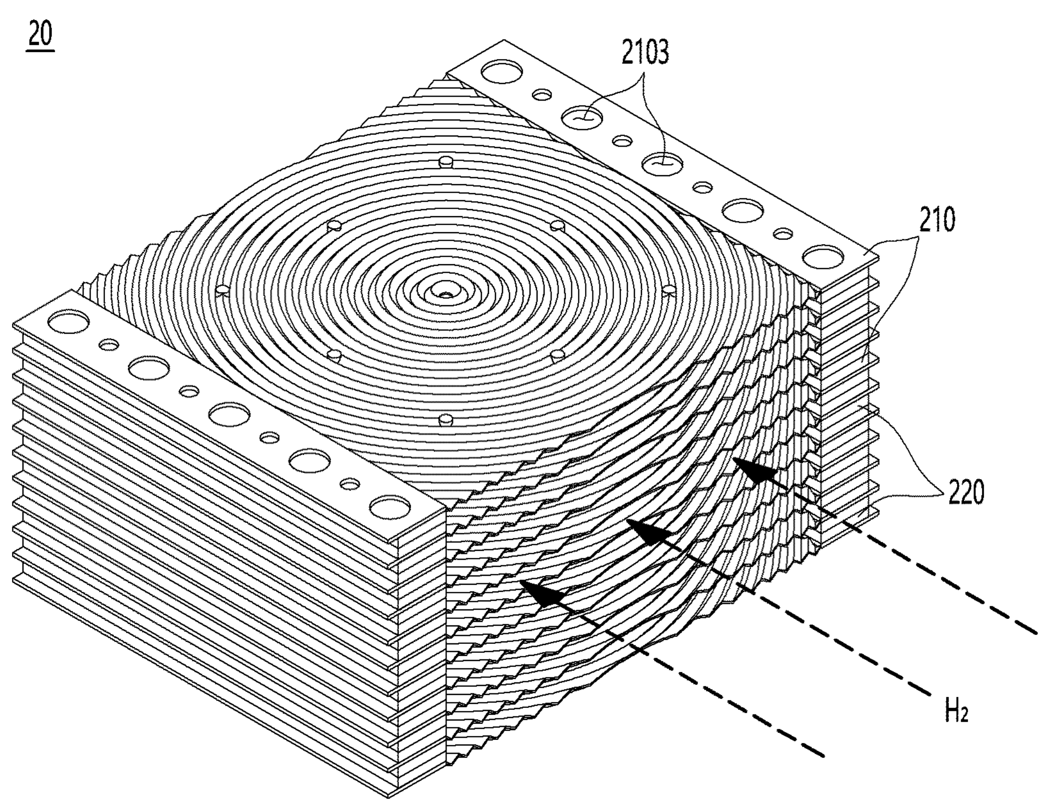
FIG. 8 is a drawing showing a state in which hydrogen is introduced into the interior of the fingerprint panel unit.

FIG. 4 is a drawing showing a fingerprint panel unit in which multiple fingerprint panels are stacked while maintaining a certain interval, FIGS. 5 to 7 are side exploded drawings specifically showing the fingerprint panel unit shown in FIG. 4, and FIG. 8 is a drawing showing a state in which hydrogen is introduced into the interior of the fingerprint panel unit.

The fingerprint panel unit (20) forms a high-density electric field flux using externally applied direct current to repeatedly activate the flowing hydrogen several times to increase the ionization rate. The fingerprint panel unit (20) is structured so that the hydrogen that has entered the interior is ionized immediately as it passes through a sharp bend, and electricity is generated, and the remaining hydrogen rotates along the bend bumps for a long time and enters the hydrogen fuel cell stack (B) with increased activation energy to easily ionize, thereby increasing the overall electricity generation efficiency.

This fingerprint panel unit (20) includes a plurality of fingerprint panels (210). At this time, the plurality of fingerprint panels (210) include a first fingerprint panel (211) connected to the positive terminal of an external power supply device and a second fingerprint panel (212) connected to the negative terminal of the external power supply device. This fingerprint panel unit (20) has a structure in which the first fingerprint panel (211) and the second fingerprint panel (212) are stacked at a certain interval, thereby forming a special ultra-high density electric field flux region. Both the first fingerprint panel (211) and the second fingerprint panel (212) include a plurality of sharp uneven circular threads (2101) formed in a concentric circle from the center to the outside, and a sharp uneven circular groove (2102) formed between the plurality of sharp uneven circular threads (2101). And it includes a plurality of connecting holes (2103) formed on one side and the other side. In addition, the first fingerprint panel (211) and the second fingerprint panel (212) include a plurality of receiving grooves (2104) formed on one side and the other side. Here, the first fingerprint panel (211) is arranged on one side of the second fingerprint panel (212) in a shape in which the second fingerprint panel (212) is turned over. In addition, an intervening unit (220) and a plurality of space forming modules (230) may be interposed between the first fingerprint panel (211) and the second fingerprint panel (212). Here, the intervening unit (220) is formed with a plurality of overlapping holes (221), and can be interposed between the first fingerprint-type panel (211) and the second fingerprint-type panel (212) such that the plurality of overlapping holes (221) overlap each of the plurality of connecting holes (2103). In addition, as illustrated in FIG. 6, a portion of the space-forming module (230) is accommodated in a receiving groove (2104) formed in the first fingerprint-type panel (211), and the remainder is accommodated in a receiving groove (2104) formed in the second fingerprint-type panel (212).

At this time, the space forming module (230) is formed in multiple pieces to support the first fingerprint panel (211) and the second fingerprint panel (212), and prevents the first fingerprint panel (211) and the second fingerprint panel (212) from sagging from one side to the center and from the center to the other side, and maintains a certain gap to prevent an electrical short circuit from occurring.

The first fingerprint panel (211) and the second fingerprint panel (212) are spaced apart at a certain interval by the space forming module (230) to form a space (D) between the first fingerprint panel (211) and the second fingerprint panel (212), as shown in FIGS. 7 and 8. Here, the space (D) is the main space where the electric field flux with the highest density exists to ionize hydrogen gas, and the remaining fingerprint uneven portion mainly becomes a space that induces activation. Then, hydrogen passes straight through the space formed in this way or rotates in the fingerprint uneven space, receives activation energy, and finally, when passing through the space (D), it is ionized to generate electricity and moves to the hydrogen fuel cell stack (B). Here, one connecting hole (2103) formed in the first fingerprint panel (211), one overlapping hole (221) formed in the intervening unit (220), and one connecting hole (2103) formed in the second fingerprint panel (212) overlap, and a fixing bar unit (30) as shown in FIG. 4 is inserted therein, so that a plurality of first fingerprint panels (211) and a plurality of second fingerprint panels (212) are stably fixed.

The fixed bar unit (30) is inserted into the connecting hole (2103) formed in the first fingerprint panel (211) and the second fingerprint panel (212) and the overlapping hole (221) of the intervening unit (220), and stably fixes the first fingerprint panel (211), the intervening unit (220), and the second fingerprint panel (212).

When a direct current is applied to the first fingerprint panel (211) and the second fingerprint panel (212) while a plurality of first fingerprint panels (211) and second fingerprint panels (212) are fixed, a high-density electric field flux is formed between the first fingerprint panel (211) and the second fingerprint panel (212). More specifically, a high-density electric field flux is formed between the sharp uneven circular thread (2101) of the first fingerprint panel (211) and the sharp uneven circular thread (2101) of the second fingerprint panel, and between the sharp uneven circular groove (2102) of the first fingerprint panel (211) and the sharp uneven circular groove (2102) of the second fingerprint panel.

At this time, by moving the positions of the first fingerprint panel (211) and the second fingerprint panel module (212) left, right, up and down at a certain interval, it is possible to induce electric field fluxes of various shapes into new shapes, thereby achieving a high efficiency.

These various high-density electric field fluxes ionize hydrogen flowing into the space (D) between the first fingerprint-type panel (211) and the second fingerprint-type panel (212) and increase activation energy. That is, the first fingerprint-type panel (211) and the second fingerprint-type panel (212) are connected to the negative/positive electrodes of an external direct current power supply, respectively, to form an electric field, ionize some of the hydrogen flowing from the hydrogen supply device (A), increase the activation energy of the remaining hydrogen, and increase the overall electricity generation rate of the hydrogen fuel cell stack.

The process of cationizing and neutralizing hydrogen by an electric field formed within a structure in which a fixed bar unit (30) is unified between fingerprint panel units (20) will be described in detail later.

Hereinafter, with reference to FIGS. 9 to 13, the state in which the hydrogen activation/ionization accelerating apparatus having the fingerprint panel stack structure of the present invention cationizes/neutralizes hydrogen, the process of ionizing hydrogen, and the process of charging the auxiliary battery unit will be specifically described.

Figure 9:
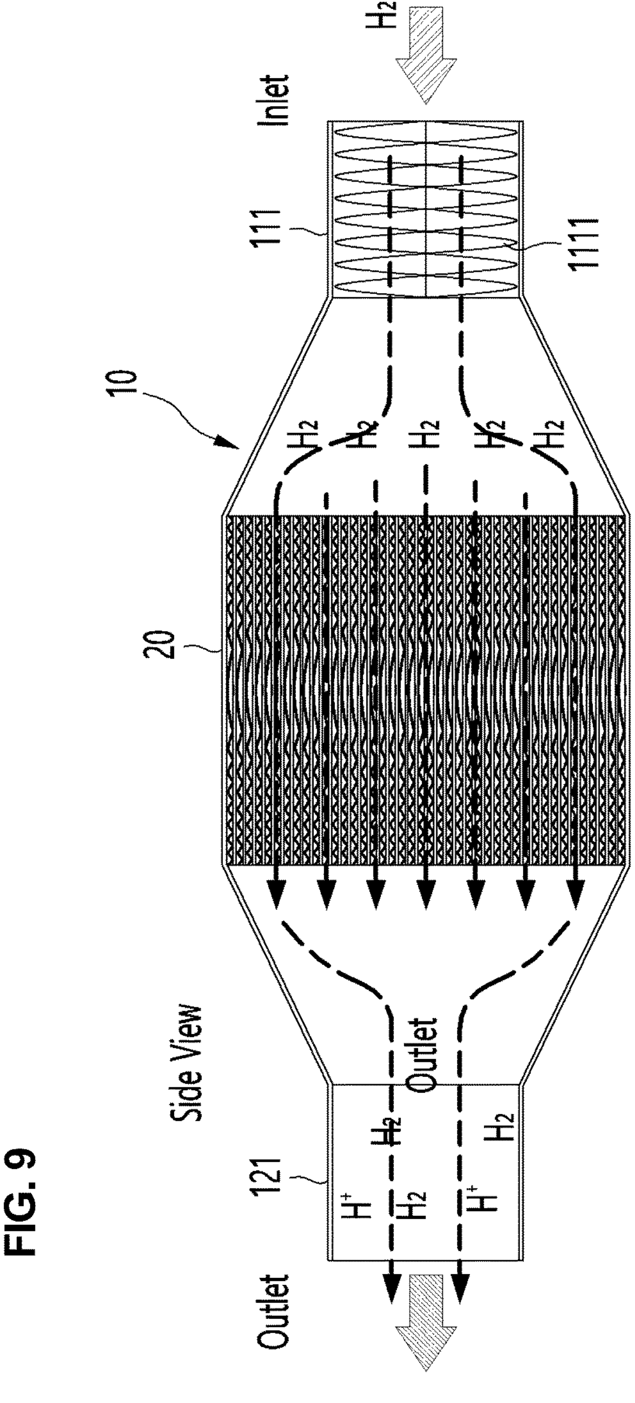
FIG. 9 is a cross-sectional view of a hydrogen activation/ionization accelerating apparatus having a fingerprint panel stacking structure according to an embodiment of the present invention of FIG. 2, taken along line I-I'.

FIG. 9 is a cross-sectional view of a hydrogen activation/ionization accelerating apparatus having a fingerprint panel stacking structure according to an embodiment of the present invention of FIG. 2, taken along line I-I', FIGS. 10 to 13 are drawings showing that in a fingerprint panel stack structure according to an embodiment of the present invention, by a strong high-density electric field flux distribution (a) and an electric field intensity, (b) hydrogen is activated, (c) ionized at the anode to release electrons, and (d) hydrogen ($2H^+$: Proton), which is a strong positive charge, easily absorbs electrons at the cathode (copper with lower ionization energy than hydrogen) to become neutral, thereby repeatedly generating electricity multiple times to generate N electricity in an overlapping manner.

The hydrogen activation/ionization accelerating apparatus (1) having a fingerprint panel stack structure comprises a fingerprint panel section (20) in which a first fingerprint panel (211) is connected to a positive electrode of a DC power supply and a second fingerprint panel (212) is connected to a negative electrode of the power supply, thereby ionizing hydrogen flowing between the first fingerprint panel (211) and the second fingerprint panel (212).

Hereinafter, the operation of the hydrogen activation/ionization accelerating apparatus (1) having a fingerprint panel stack structure including a fingerprint panel unit (20) will be specifically described.

In a hydrogen activation/ionization accelerating apparatus (1) having a fingerprint panel stack structure, when direct current is applied from an external power supply (C) to the fingerprint panel unit (20), hydrogen is supplied from a hydrogen supply device (A) to the fingerprint panel unit (20). At this time, the inlet screw module (1111) widely and evenly spreads the hydrogen injected from the hydrogen supply device (A) into the receiving space (100) of the case (10) as a spiral eddy flow as much as possible throughout the entire space. A plurality of fingerprint panel units (20) to which electricity is applied form a high-density electric field flux and ionizes/activates the hydrogen supplied from the hydrogen supply device.

Figure 10:
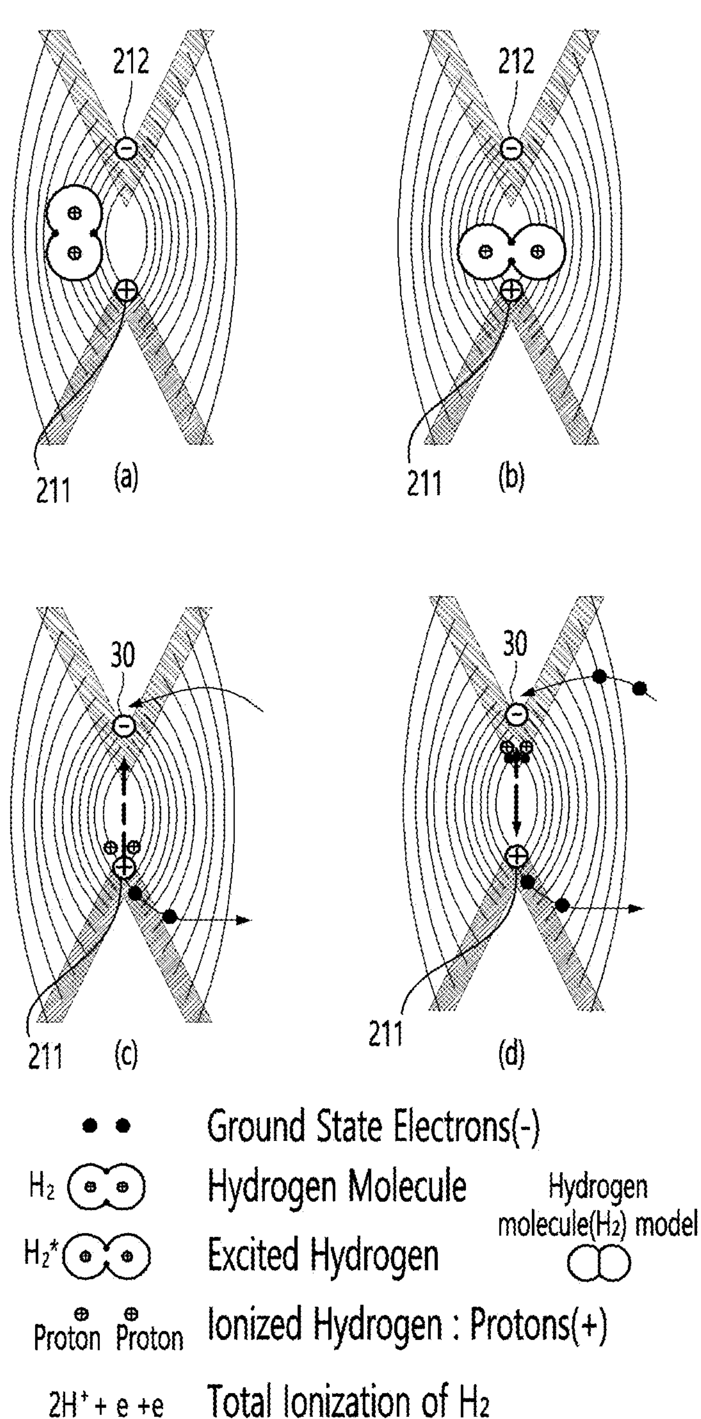
FIGS. 10 to 13 are drawings showing that in a fingerprint panel stack structure according to an embodiment of the present invention, by a strong high-density electric field flux distribution (a) and an electric field intensity, (b) hydrogen is activated, (c) ionized at the anode to release electrons, and (d) hydrogen ($2H^{+}$: Proton), which is a strong positive charge, easily absorbs electrons at the cathode (copper with lower ionization energy than hydrogen) to become neutral, thereby repeatedly generating electricity multiple times to generate N electricity in an overlapping manner.

More specifically, as shown in FIG. 10, when a direct current is applied to the fingerprint panel unit (20), a positive electric field generated from the positive electrode is generated in the first fingerprint panel (211), and a negative electric field generated from the negative electrode is generated in the second fingerprint panel (212), and a high-density electric field flux is formed between the first fingerprint panel (211) and the second fingerprint panel (212). Here, the positive electric field generated from the positive electrode has greater energy than the nuclear force that binds electrons in hydrogen molecules ($H_2$), so it activates (excites) the hydrogen molecules. The negative electric field generated from the negative electrode forms a repulsive force of the shared electrons of the hydrogen molecules ($H_2$) and causes the shared electrons in the hydrogen molecules to repel, thereby activating (exciting) the hydrogen molecules. At this time, the excited hydrogen moves to the multiple sharp uneven circular threads (2101) of the first fingerprint-type panel (211) connected to the positive electrode, and is cationized (2H++2e) as electrons are removed from the sharp uneven circular threads of the first fingerprint-type panel (211). At this time, the cationized hydrogen, i.e., protons, quickly move to the second fingerprint-type panel (212) connected to the negative electrode due to the strong repulsion of the positive electric field and the strong attraction of the negative electric field.

And the cationized hydrogen ($2H^+$) that has moved to the second fingerprint panel (212) absorbs electrons ($2e^-$) from copper of the second fingerprint panel (212) which has lower ionization energy than hydrogen (Field Emission Electron), and is transformed into hydrogen molecules ($H_2$), i.e., neutral hydrogen, and additionally generates electric current due to the movement of electrons. At this time, the transformed hydrogen molecules ($H_2$) move to the first fingerprint panel (211) connected to the positive electrode again and are cationized, and the cationized hydrogen moves to the second fingerprint panel (212) connected to the negative electrode again and is transformed into neutral hydrogen ($H_2$). That is, the hydrogen supplied from the hydrogen supply device (A) repeatedly generates electricity while continuously going through the above process, that is, the excited state, the ionized state, and the neutralized state. Hydrogen that has gone through ionization and neutralization in this way has high activation (excited) energy and can smoothly and repeatedly produce electricity in a hydrogen fuel cell, thereby increasing power generation.

Figure 11:
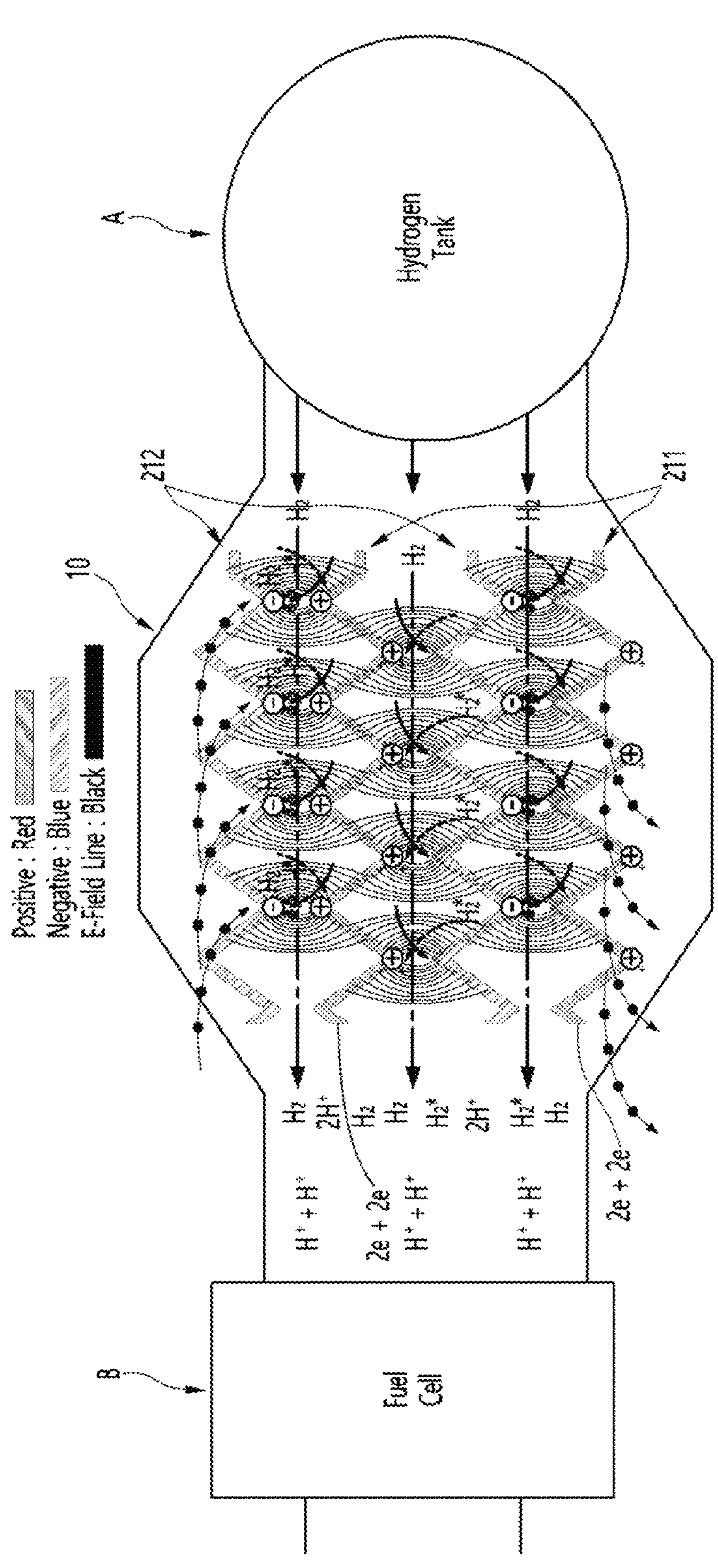
Figure 12:
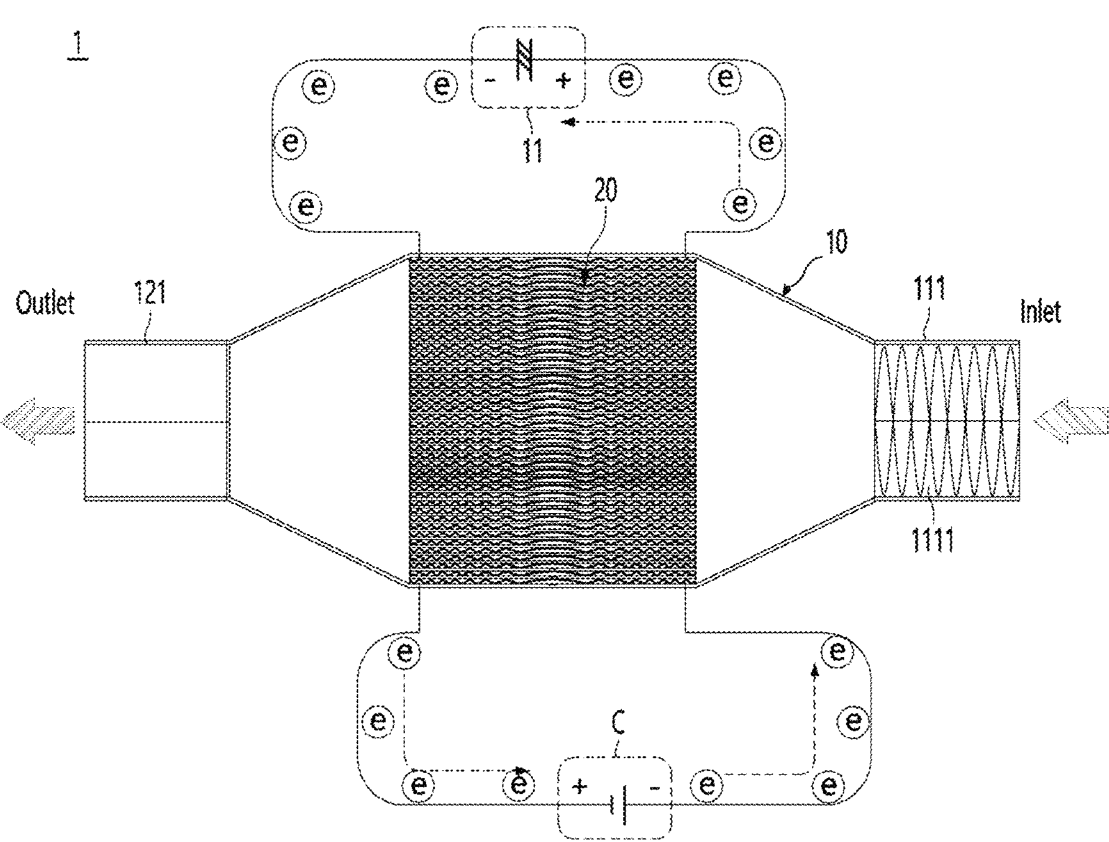
Figure 13:
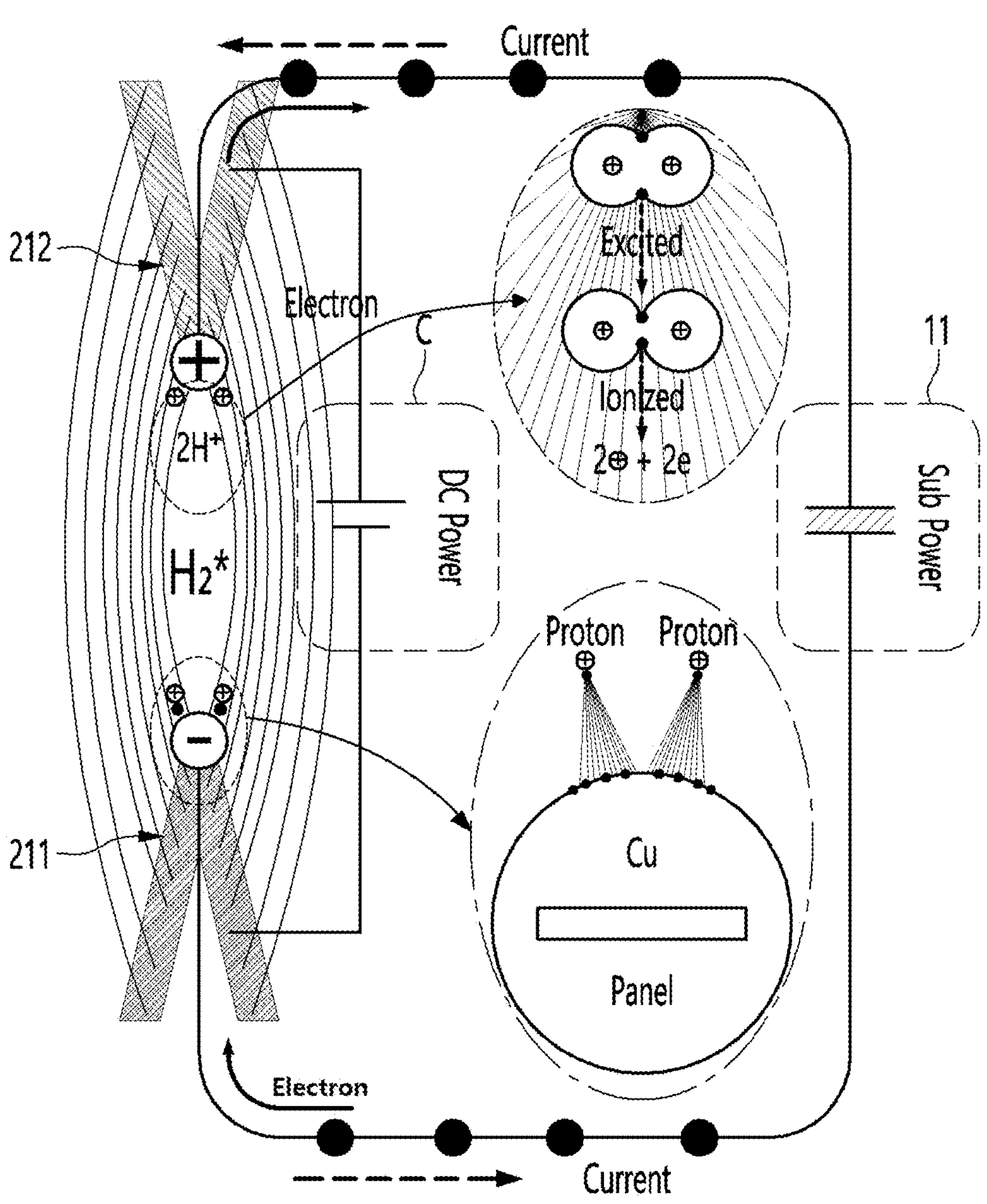

As shown in FIG. 11, a plurality of fingerprint panel units (20) transform hydrogen ($H_2$) supplied from a hydrogen supply device (A) into Excited State ($H_2$*)→Ionized ($2H^+$+2e)→Neutralized ($H_2$) through a strong negative/positive electric field and extract electrons from the hydrogen ($H_2$) (Field Emission Electrons). Then, as shown in FIGS. 12 and 13, the electrons extracted from the hydrogen are moved to the auxiliary battery unit (11) and charged in the auxiliary battery unit (11). Alternatively, the electricity generated from the fingerprint panel unit (20) may be added to the power generation of a conventional hydrogen fuel cell. Here, the Excited State ($H_2$*) means hydrogen in an energy level in which the activation energy is high due to the attraction/repulsion of an electric field and which can be easily ionized.

This hydrogen becomes a catalyst process that increases the efficiency of electricity generation of hydrogen fuel cells. Ionized hydrogen ($2H^{+}$+2e) means Proton ($H^{+}$) that is released by electrons by the positive electric field and moves to the cathode by electrostatic force. And neutralized hydrogen ($H_2$) is hydrogen formed when 2 Proton ($H^{+}$) that has moved to the cathode absorbs 2 electrons by the high-density positive electric field.

In this way, the present invention improves the performance of a hydrogen fuel cell stack (B) by transforming hydrogen gas into three states, including $H_2$, $2H^{+}$+2e, and $H_2$*, by means of negative/positive high-density electric fields. In addition, by transforming hydrogen gas into electrostatic dynamics, a large amount of electricity is generated, which can be stored or joined to existing electricity generation or charged to an auxiliary battery for later use. In addition, the present invention allows the electricity generated by transforming hydrogen into various states to be stored in an auxiliary battery unit (11) and then applied to a fingerprint panel unit (20) at a later time, thereby increasing the operating efficiency of the fingerprint panel unit.

Although the embodiments of the present invention have been described with reference to the attached drawings, those skilled in the art will understand that the present invention can be implemented in other specific forms without changing the technical idea or essential features thereof. Therefore, it should be understood that the embodiments described above are exemplary in all respects and not restrictive.

DESCRIPTION OF REFERENCE NUMERALS

1: Hydrogen activation/ionization accelerating apparatus having a fingerprint panel stack structure
10: Case 11: Auxiliary battery unit
100: Accommodation space
110: Cover unit 120: Body unit
111: Gas inlet tube 121: Gas discharge tube
1111: Inlet screw module
20: Fingerprint panel unit
210: fingerprint-type panels
2101: Sharp uneven circular thread
2102: Sharp uneven circular groove
2103: Connecting hole 2104: Receiving groove
211: First fingerprint-type panel 212: Second fingerprint-type panel
220: Intervening unit 221: Overlapping hole
230: Space forming module 30: Fixed bar unit
A: Hydrogen supply unit B: Hydrogen fuel cell stack
C: External power supply unit D: Intermediate space

The invention claimed is:

1. A hydrogen activation/ionization accelerating apparatus with a fingerprint-type panel stack structure installed between the hydrogen supply device (A) and the hydrogen fuel cell stack (B), the apparatus comprising:

a case (10) in which an accommodation space (100) is formed inside, a gas inlet tube (111) is formed at one end to be connected to the accommodation space (100) and a hydrogen supply device (A), and a gas discharge tube (121) is formed at the other end to be connected to the accommodation space (100) and a hydrogen fuel cell (B); and a fingerprint panel unit (20) comprising, a first fingerprint panel (211) and a second fingerprint panel (212) which are formed as multiple fingerprint-shaped panels in a concentric circle from the center to the outside, with a sharp uneven circular thread (2101), a sharp uneven circular groove (2102), and multiple connecting holes (2103) formed at one end and the other end, and an intervening unit (220) comprises a plurality of overlapping holes (221), and is interposed between the first fingerprint panel (211) and the second fingerprint panel (212) so that the overlapping holes (221) overlap with the connecting holes (2103), wherein the first fingerprint panel (211) is connected to the positive electrode of the power supply and the second fingerprint panel (212) is connected to the negative electrode of the power supply to activate and ionize hydrogen flowing between the first fingerprint panel (211) and the second fingerprint panel (212).

2. The apparatus of claim 1, wherein the first fingerprint panel (211) and the second fingerprint panel (212) comprises:

a plurality of receiving grooves (2104) formed on one side and the other side.

3. The apparatus of claim 1, further comprising:

a fixing bar unit (30) that penetrates one connecting hole (2103) formed in the first fingerprint panel (211), one overlapping hole (221) formed in the intervening module (220), and one connecting hole (2103) formed in the second fingerprint panel (212), and fixes the first fingerprint panel (211), the intervening module (220), and the second fingerprint panel (212).

4. The apparatus of claim 1, which is connected to an auxiliary battery unit (11) that is connected at one end to the first fingerprint panel (211) and at the other end to the second fingerprint panel (212), and is charged with electricity generated and applied from the first fingerprint panel (211) and the second fingerprint panel (212).

* * * * *